United States Patent
Jorda et al.

(10) Patent No.: US 12,269,156 B2
(45) Date of Patent: Apr. 8, 2025

(54) LOCAL AUTONOMY-BASED HAPTIC ROBOT INTERACTION WITH DUAL PROXY MODEL

(71) Applicant: The Board of Trustees of the Leland Stanford Junior University, Stanford, CA (US)

(72) Inventors: Mikael Jorda, Menlo Park, CA (US); Margot R. Vulliez, Lavoux (FR); Oussama Khatib, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 211 days.

(21) Appl. No.: 18/025,889

(22) PCT Filed: Nov. 20, 2021

(86) PCT No.: PCT/US2021/060224
§ 371 (c)(1),
(2) Date: Mar. 11, 2023

(87) PCT Pub. No.: WO2022/109353
PCT Pub. Date: May 27, 2022

(65) Prior Publication Data
US 2023/0339121 A1    Oct. 26, 2023

Related U.S. Application Data

(60) Provisional application No. 63/116,418, filed on Nov. 20, 2020.

(51) Int. Cl.
*B25J 9/16* (2006.01)
*B25J 13/02* (2006.01)
*G06F 3/01* (2006.01)

(52) U.S. Cl.
CPC .......... *B25J 13/025* (2013.01); *B25J 9/1689* (2013.01); *G06F 3/016* (2013.01)

(58) Field of Classification Search
None
See application file for complete search history.

(56) References Cited

U.S. PATENT DOCUMENTS 10,537,399 B2 * 1/2020 Eckert .................... A61B 34/30
2014/0135991 A1  5/2014 Summer
(Continued)

FOREIGN PATENT DOCUMENTS

CN    108333971    7/2018

OTHER PUBLICATIONS

Ruspini et al., Haptic interaction in virtual environments, 1997, IEEE, p. 128-133 (Year: 1997).*
(Continued)

*Primary Examiner* — Marc McDieunel
(74) *Attorney, Agent, or Firm* — LUMEN PATENT FIRM

(57) ABSTRACT

Haptic-robot control based on local autonomy and a dual-proxy model is provided. The dual proxy guarantees generation of safe and consistent commands for two local controllers, which ensure the compliance and stability of the systems on both sides. A Force-Space Particle Filter enables an autonomous modeling and rendering of the task contact geometry from the robot state and sensory data. The method suppresses the instability issues caused by the transfer of power variables through a network with communication delays in conventional haptic-robot controllers. The results demonstrated the transparency and high fidelity of the method, and robustness to communication delays. While the conventional method failed for communication delays higher that milliseconds, the dual proxy method maintained high performance for delays up to one and a half seconds.

(Continued)

The local autonomy-based haptic control of robots with the dual-proxy model enables applications in areas such as medical, underwater and space robotics.

1 Claim, 8 Drawing Sheets

(56) References Cited

U.S. PATENT DOCUMENTS

| | | |
|---|---|---|
| 2018/0021097 A1 | 1/2018 | Quaid |
| 2020/0022724 A1 | 1/2020 | Worrell |
| 2023/0054233 A1* | 2/2023 | Millman ............. A61M 1/77 |
| 2023/0277175 A1* | 9/2023 | Shelton, IV ......... A61B 34/30 |
| | | 227/176.1 |
| 2023/0309793 A1* | 10/2023 | Larkin .............. A61B 1/0016 |
| | | 600/114 |
| 2023/0320730 A1* | 10/2023 | Viola ............... A61B 17/068 |
| | | 227/175.1 |
| 2023/0338101 A1* | 10/2023 | Hasser .............. A61B 8/461 |

OTHER PUBLICATIONS

Park et al., Real-time haptic rendering and haptic telepresence robotic system for the visually impaired, 2013, IEEE, p. 229— (Year: 2013).*

Bowyer et al., Active Constraints/Virtual Fixtures: A Survey, 2014, IEEE, p. 138-157 (Year: 2014).*

Singh et al., Haptic-Guided Teleoperation of a 7-DoF Collaborative Robot Arm With an Identical Twin Master, 2020, IEEE, p. 246-252 (Year: 2020).*

Xu et al. Point-cloud based Model-mediated Teleoperation. 2013 IEEE Int. Symposium on Haptic Audio Visual Environments and Games. pp. 69-74.

Sachs et al. Adaptive 5G Low-Latency Communication for Tactile Internet Services. 2018 IEEE Proceedings, pp. 325-349.

* cited by examiner

LOCAL AUTONOMY-BASED HAPTIC ROBOT INTERACTION WITH DUAL PROXY MODEL

FIELD OF THE INVENTION

This invention relates to haptic robot interaction devices and methods.

BACKGROUND OF THE INVENTION

Robotics is a rapidly evolving field that already has much impact on our societies, with robots enhancing the production capabilities of all our industries. The next step will br in developing new robotic systems, able to evolve and work with humans in diverse environments, outside of their usual, very structured, factories. As robots become more and more present in our lives, we will need efficient and intuitive ways of interacting with them. Haptic teleoperation in particular is a modality that allows a human operator to remotely control a robot behavior while feeling the environment it is interacting with. This is very beneficial in confined, unsafe, or sensitive environments such as hazardous industry, underwater, space or surgery rooms. It enables to naturally combine human high-level intelligence and robot physical capabilities while maintaining the safety and comfort of the human operator.

One of the main goals for teleoperation systems focuses in accurately interpreting and transferring the human commands to the robot and providing a high-fidelity relevant feedback to the human. This is usually called haptic transparency, and it imposes many constraints on haptic systems. Haptic bilateral controllers in particular are subject to many challenges such as: inaccurate dynamic modeling, sensor noises, task uncertainties, human-in-the-loop disturbances, communication time delays and non-collocation. These challenges have been at the heart of haptic research as they impose a tradeoff between haptic transparency and stability on most teleoperation systems. This invention addresses these challenges.

SUMMARY OF THE INVENTION

The present invention tackled the challenges of real-world haptic teleoperation through the conceptualization and design of a new paradigm for haptic-robot control. The inventors' approach relied on autonomous behaviors on both robot and haptic sides, parametrized via a dual-proxy model. The concept of local autonomy and proxy-based haptic-robot interaction is shown in FIG. 1. The idea is to divide the global bilateral loop into three independent blocks:
1. the local haptic controller, which provides the human operator with proper haptic feedback;
2. the local robot controller, which ensures a safe and accurate behavior toward the task objective; and
3. a smart dual-proxy model, exchanging high-level information through the communication channel and generating safe and consistent command inputs for both local feedback loops.

With this approach, there are no issues due to non-collocation as robot and haptic sensory information are only used in the local control loops. As a result, it greatly increases the stability of the teleoperation system, even in the presence of significant communication time delays, without deteriorating the system's transparency in force and position. This is due to the fact that the system stability now mostly depends on the stability of each one of the local feedback controllers. This approach also seeks to address the wide differences in remote tasks, and in the physical interaction they involve, in a simple and generic framework. As such, this invention brings the following contributions:
  (i) The development of a modular and adaptable approach to haptic-robot control that relies on local and autonomous controllers instead of a global feedback loop, to suppress issues caused by non-collocation and communication delays.
  (ii) The design of a dual-proxy model that acts as a bridge between the local control loops by handling the communication and generating safe and physically consistent control inputs on both sides.
  (iii) The design of a contact perception method, the Force-Space Particle Filter, that builds a local model of the environment during the robot operation and enables a fully autonomous parameterization of the controllers by the dual-proxy model.
  (iv) Experimental validation of the new haptic teleoperation system on diverse contact interaction scenarios.

Embodiments of the invention provides advantages over existing methods and systems. For example, existing haptic control methods become unstable or dangerous when the communication delays between the robot and haptic device gets around 100 milliseconds or less. Typically, existing methods do not allow to teleoperate a robot with haptic feedback over the internet across the globe. Embodiments of this invention make it possible as it is robust to delays above 1 second.

In one embodiment, the invention is defined as a method for controlling a robot via a haptic interface. In this method one would have a robot controlled by a local, independent robot controller. The robot interacts with an environment. The robot controller distinguishes a unified force and motion controller, parametrized autonomously. The method further has a haptic device controlled by a local, independent haptic controller. The haptic controller distinguishes a unified force and motion controller, parametrized autonomously. The method further has an environment estimator near or within the robot controller estimating single or multi-dimensional geometric constraints from the robot interactions with the environment. The geometric constraints are defined in orientation and position. A dual proxy model is further part of the method separately connecting the robot controller and the haptic controller. The dual proxy model calculates outputs defined as (i) a parametrization for the robot and haptic unified controllers, (ii) a force command and a motion command for the robot unified force and motion controller, (iii) a force feedback command and a motion command for the unified force and motion haptic controller. The outputs are calculated by the dual proxy model receiving inputs defined as (j) position information from the haptic device, (jj) the geometric constraints from the environment estimator, and (jjj) position information from the robot, and wherein the calculated outputs are consistent with the robot and haptic device capabilities, and with a safe haptic-robot interaction.

Local controllers regulate the desired behaviors on both sides. The global feedback loop is broken into these three separated components.

Figure 2:
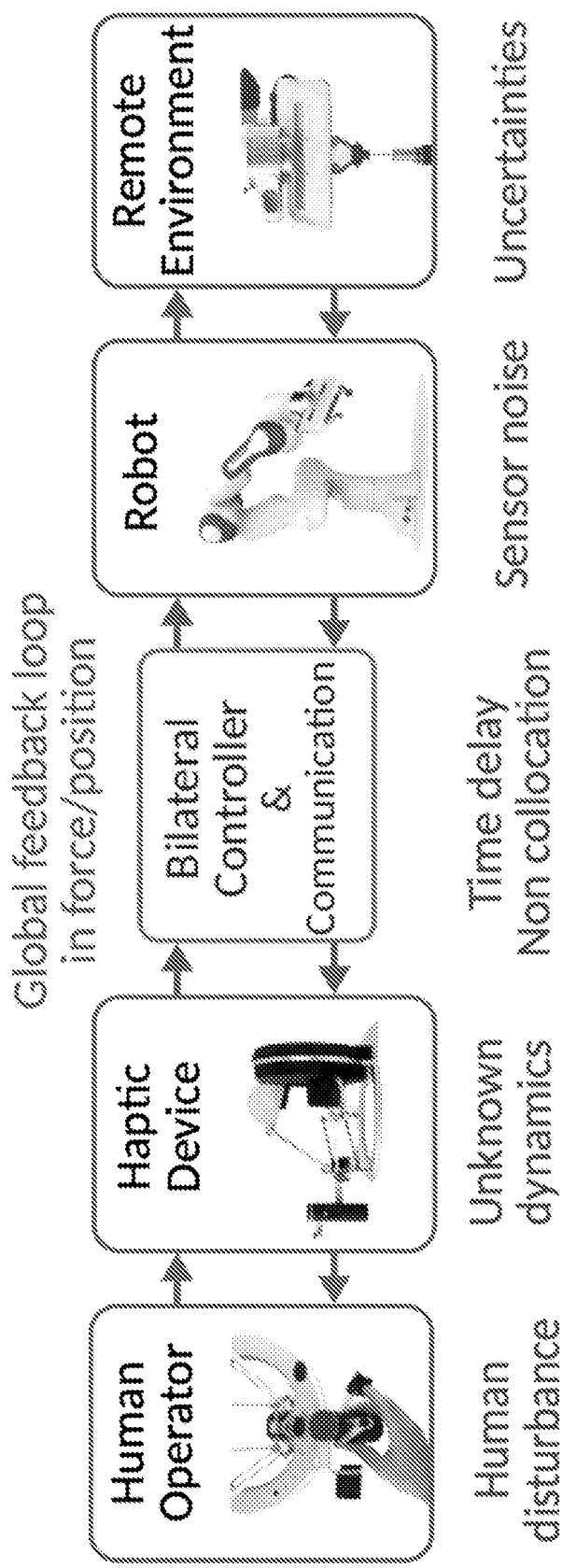

FIG. 2 shows according to an exemplary embodiment of the invention conventional haptic bilateral control implemented with a global feedback loop, which suffers from uncertainties and limits of the teleoperator, non-collocation and time delays. Such drawbacks result in a trade-off between haptic transparency and stability in real-world applications.

Figure 3:
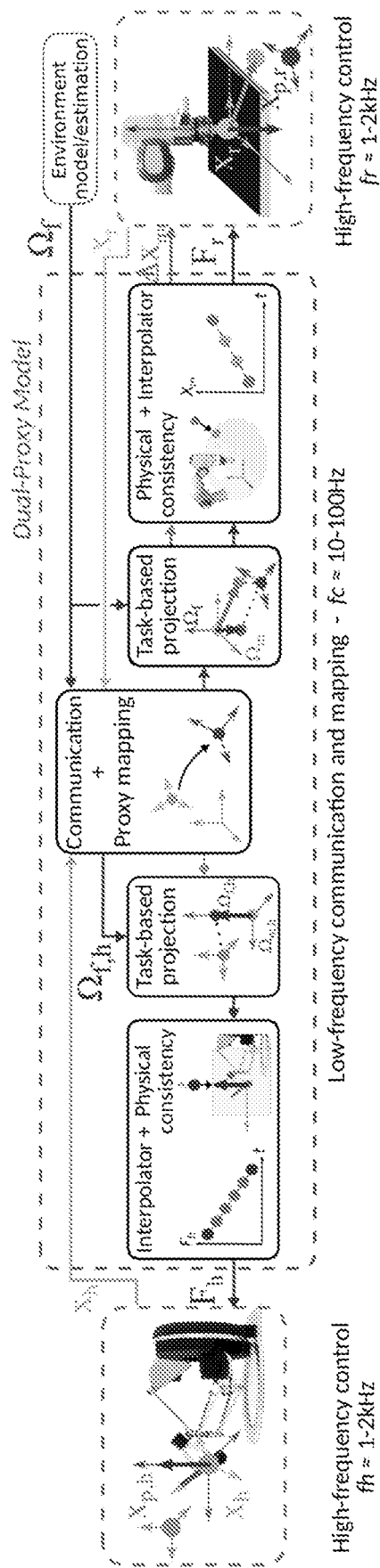

FIG. 3 shows according to an exemplary embodiment of the invention a smart dual-proxy model replicating haptic-robot interactions within the local autonomy-based framework. It receives robot and task-related information through the network and computes respective proxys for the two robots. Safe and consistent control inputs are generated on both sides from the robot-proxy and haptic-proxy interaction.

Figure 4:
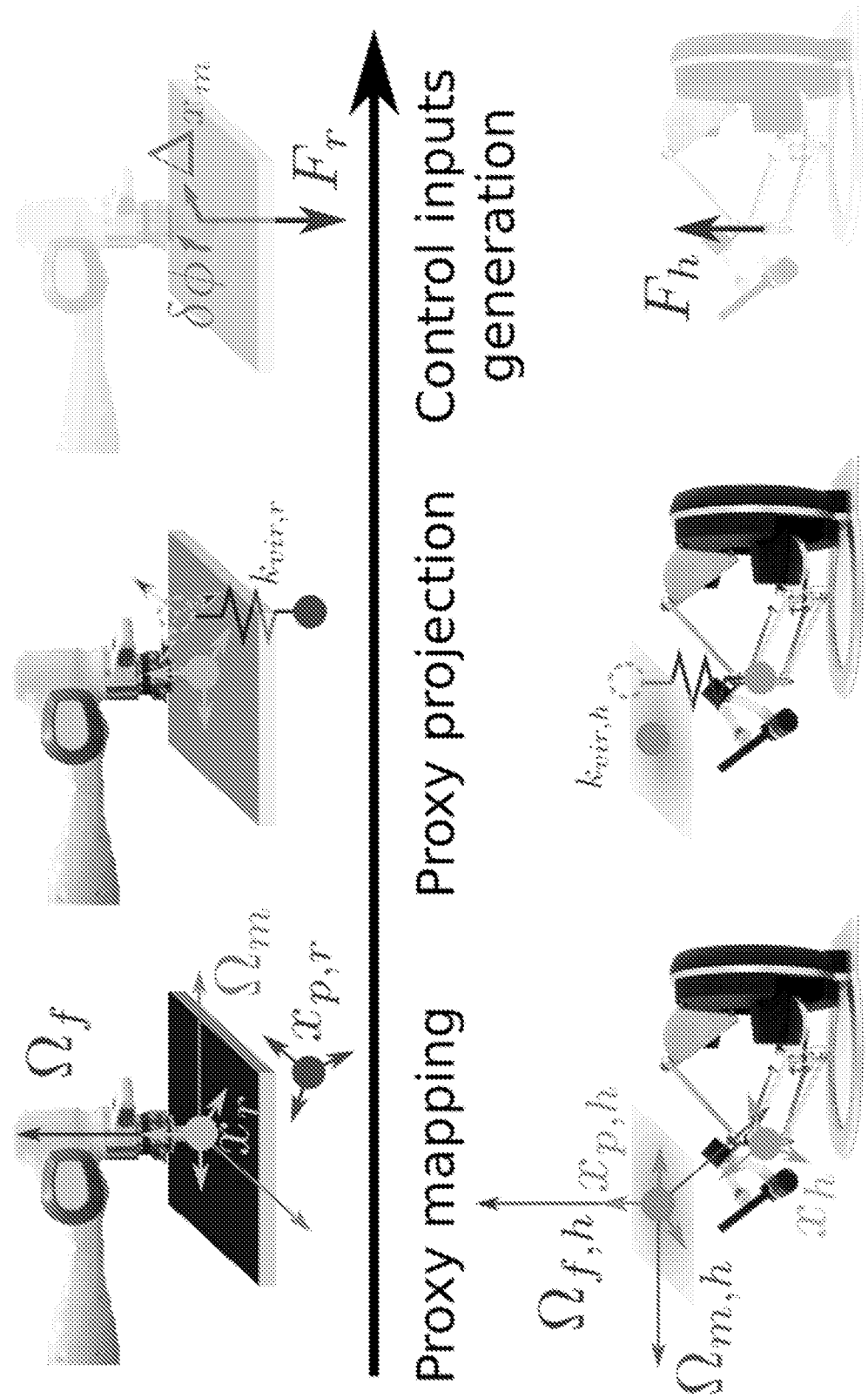

FIG. 4 shows according to an exemplary embodiment of the invention force/motion-space projection of the robot-proxy and haptic-proxy interactions to generate consistent local control inputs. Left: $\Omega_f$ and $\Omega_m$ represent the force space and motion space projections respectively. They allow to construct a local model of the environment geometry on the haptic side (gray plane). $x_r$ in 'cyan' (gray scale) and $x_h$ in 'pink' (gray scale) are the positions of the robot and haptic device, $x_{p,r}$ in magenta is the robot-proxy position, and $x_{p,h}$ in 'blue' (gray scale) is the haptic-proxy position. Middle: The proxys are projected onto the force space and motion space, a virtual spring is used in the force space to generate a force from the difference in positions. Right: Control inputs are generated using interpolation and safety checks. On the robot side, a position error $\Delta_{xm}$ is generated in the motion space, and an orientation error $\delta_\varphi$ to perform orientation control. In the force space, a reference force $F_r$ is generated. On the haptic side, only a reference force $F_h$ is generated in this example.

Figure 5:
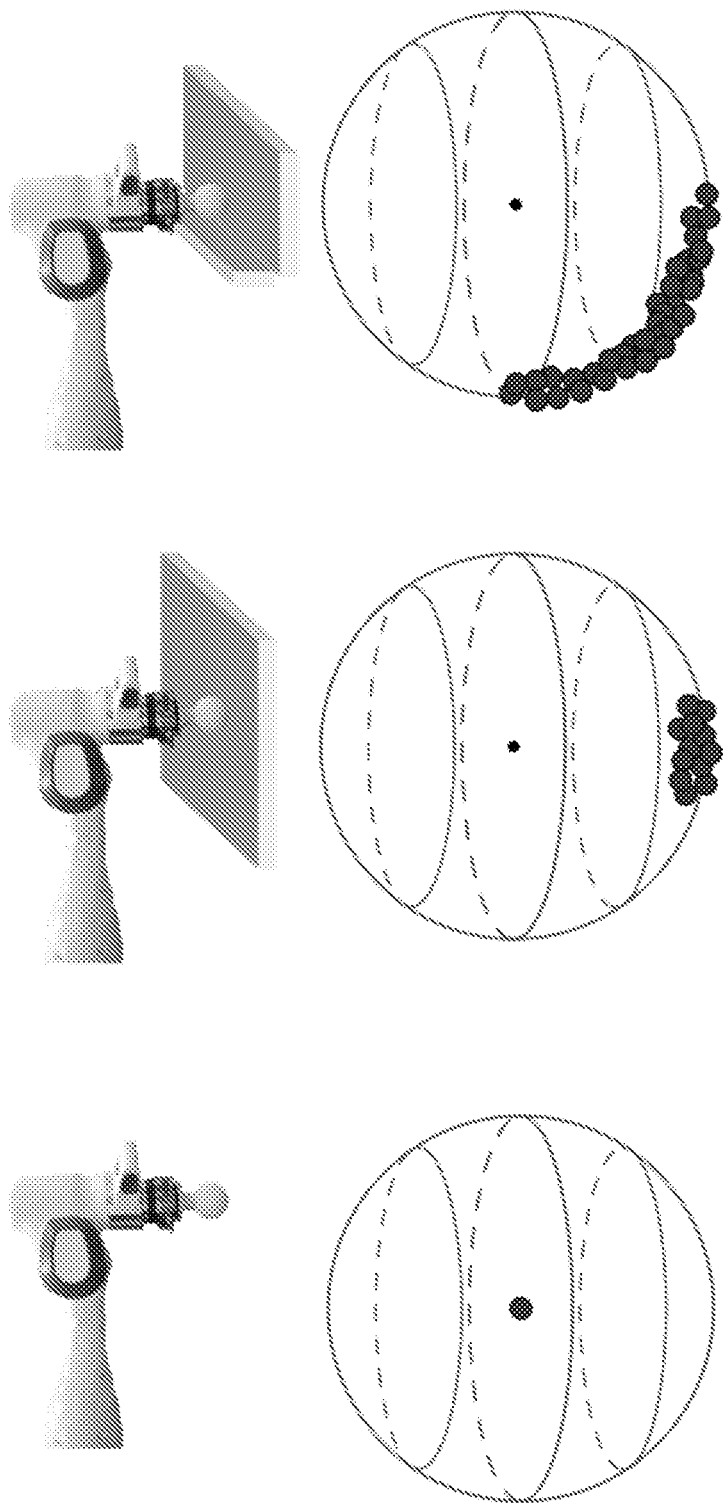

FIG. 5 shows according to an exemplary embodiment of the invention a Force-Space Particle Filter. The top row shows the robot and potential contact scenarios, the bottom row shows a corresponding distribution of the particles. Left: no contact. Middle: one direction of contact. Right: two directions of contact.

Figure 6:
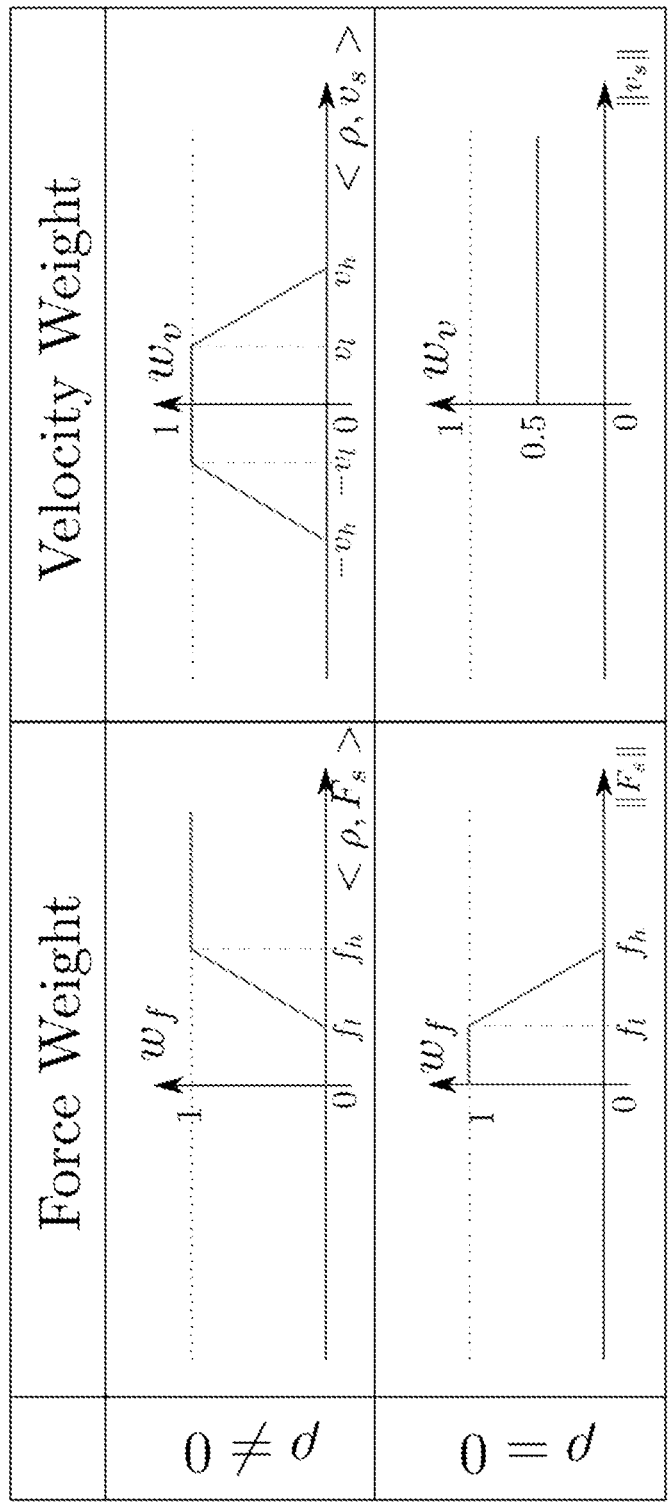

FIG. 6 shows according to an exemplary embodiment of the invention force and velocity weight functions used in the Force Space Particle Filter.

Figure 7:
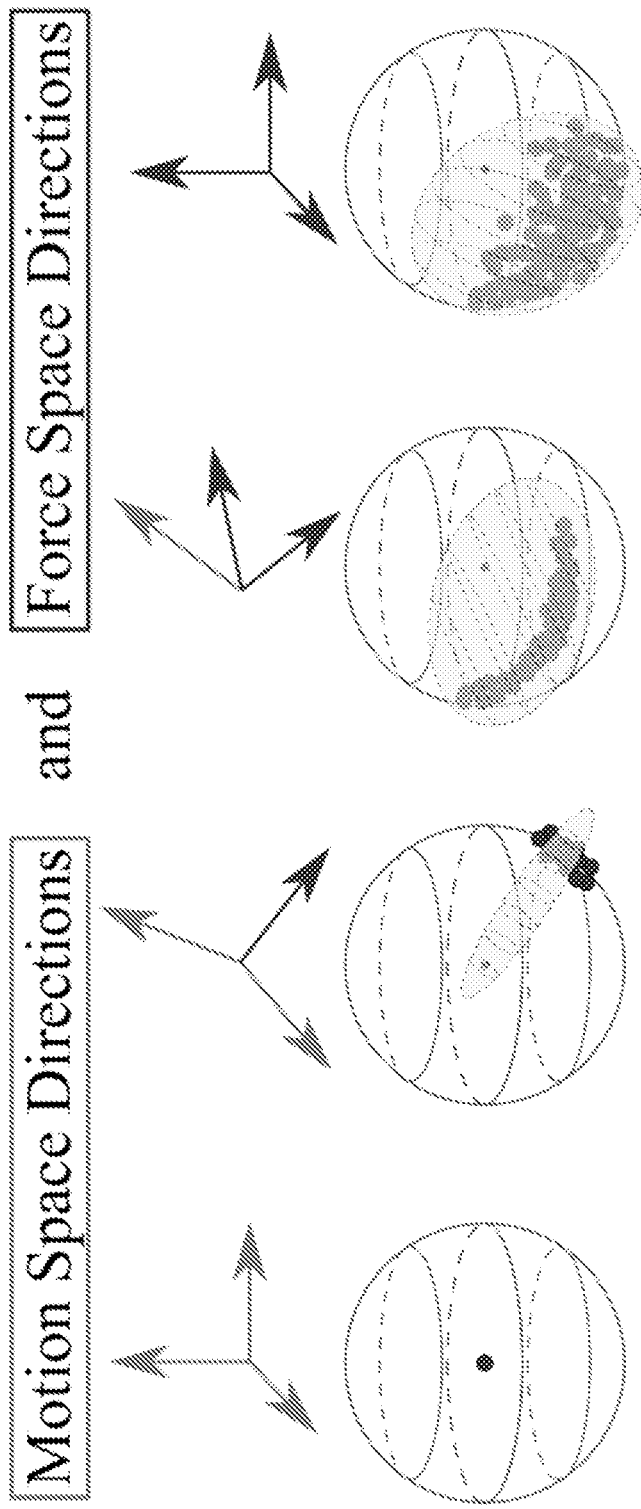

FIG. 7 shows according to an exemplary embodiment of the invention motion and force spaces for a given list of particles are found by performing a SVD of the particles. The high singular values correspond to force directions and the low singular values to motion directions.

Figure 8:
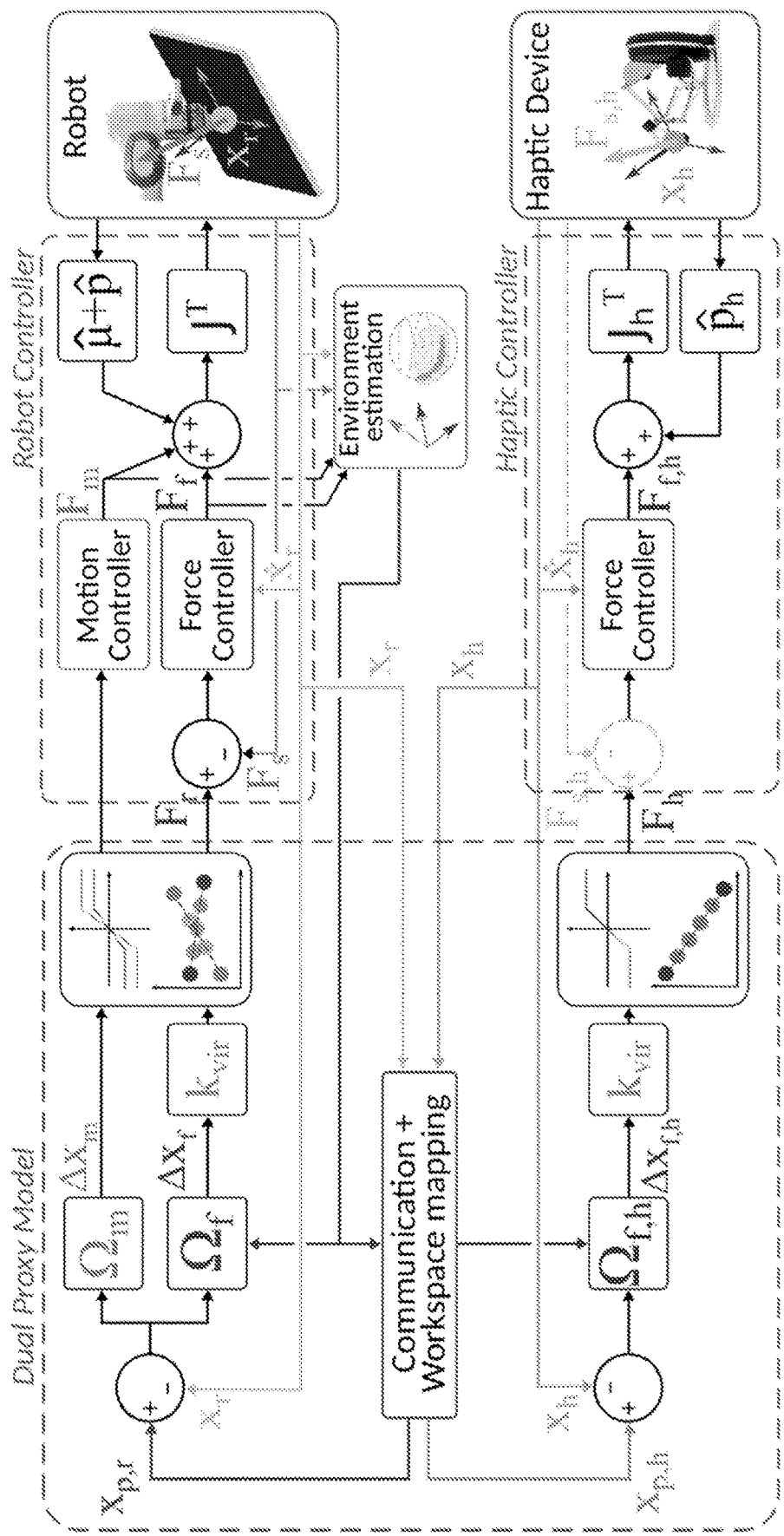

FIG. 8 shows according to an exemplary embodiment of the invention a block diagram of the local autonomy-based dual-proxy framework with the selection of local controllers.

DETAILED DESCRIPTION

Framework for Haptic-Robot Interaction

In this invention, the inventors' rethought haptic teleoperation through a local autonomy-based control strategy. The idea was to implement local controllers at the robot and haptic device sides, to respectively monitor the task actions and provide a proper perception to the user, while only exchanging high-level passive variables between the two robots. This sliced approach is based on the introduction of the dual-proxy model: a smart bridge between the two local loops which encodes haptic-robot interactions.

Local Autonomy-Based Approach

The state-of-the-art points that a mandatory compromise has to be done between stability and fidelity once power variables are transmitted through a global feedback loop between the haptic device and the remote robot. In a position-position controller, intrinsic stability and robustness to time delay can be achieved by removing force/velocity non-collocation in the global bilateral architecture. To this end, the approach presented herein minimizes non-collocations by only closing the feedback loop locally at the device and robot sides, and exchanging high-level information between the two local controllers. A dual-proxy model computes setpoints to the two local loops with respect to the task-controlled modalities and exchanged data.

Figure 1:
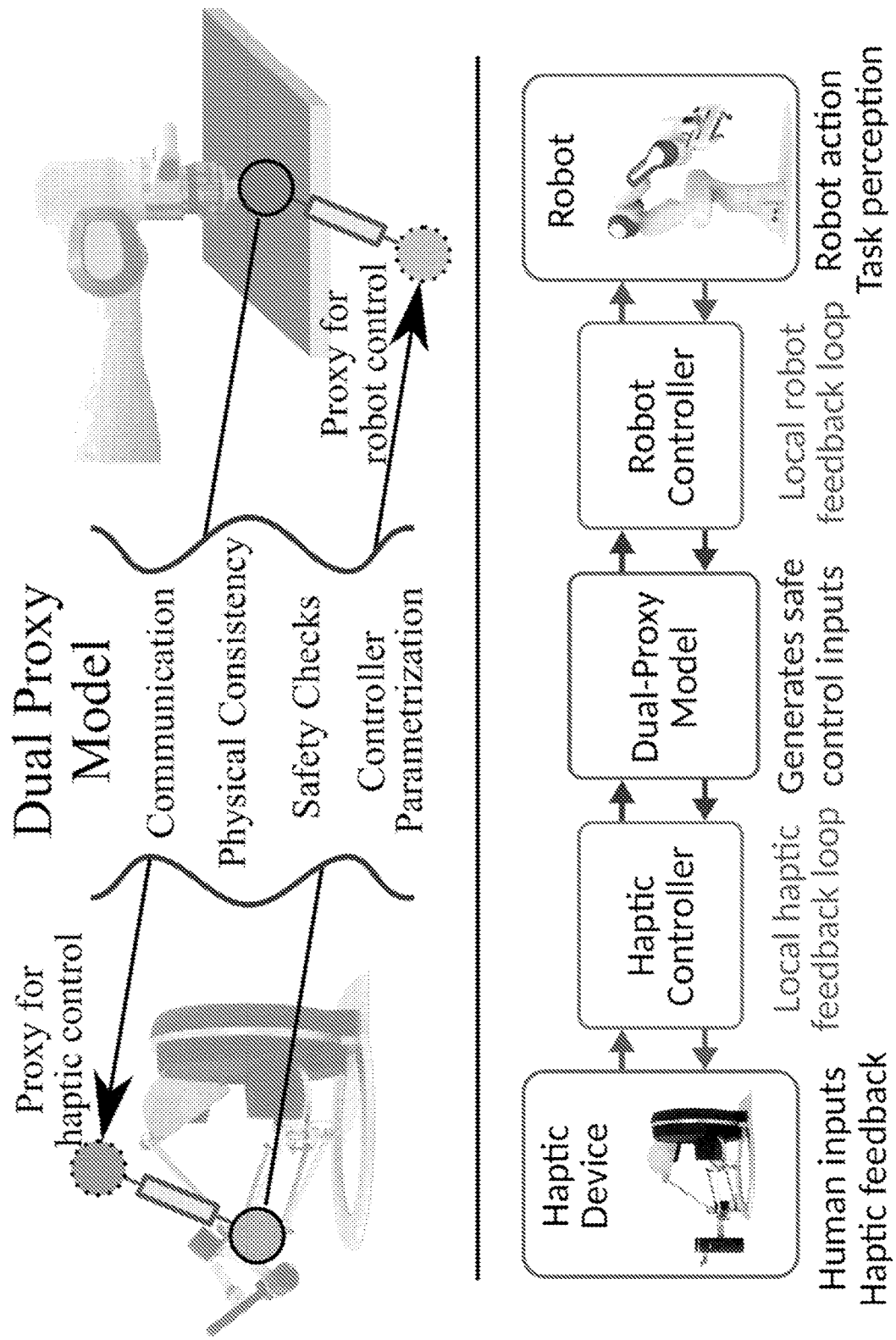
FIG. 1 shows according to an exemplary embodiment of the invention a dual-proxy model for local autonomy-based haptic interaction. The dual-proxy model computes proxys for the robot and haptic controllers, and parametrizes the controllers to generate safe and consistent control inputs.

The concept of the haptic control framework is shown in FIG. 1. It has three main components: the haptic device local control loop, the robot local control loop, and the dual-proxy model. Dividing the teleoperation scheme in these two local loops, linked by the dual-proxy model, endows the haptic device and the robot with a certain autonomy. The local loops handle the motion and force control of the two robots, which prevents the exchange of direct force/velocity data through the communication channel. Besides removing non-collocation in the global haptic-robot network, this local autonomy-based approach separates functions and objectives of the two robots. The haptic device must reflect the perception of the task to the human operator through proper force feedback. To meet this perception objective, the haptic local loop must generate a high-fidelity remote sensing of the environment, which means that free space must feel free while contact with objects must feel real. On the other hand, the robot must perform the remote actions to do the task while tracking the human inputs. The robot controller monitors the end-effector dynamic behavior and the task physical interactions, involving both precise motion and contact force. Each local controller is designed independently of the other and tuned with respect to its targeted performances.

Using autonomous local controllers make this approach very modular and general because they can be easily changed and tuned to adapt to different tasks and different hardware, without having to redesign the whole system.

Dual-Proxy Model

The idea of proxy in haptics is to create a point, the proxy, in the virtual environment that kinematically follows the user input, but is subject to the constraints of the virtual environment. This proxy is then used to generate a haptic spring force that tries to bring the haptic device back to the position of the proxy. It is a very effective way to render a virtual environment haptically.

The idea of the dual-proxy model is to define two proxys, one for the robot and one for the haptic device that will be used to generate commands for the local controllers. The proxys are, therefore, virtual objects which represents the behavior of the two robots in the workspace of their counterparts. With this proxy-based approach, only position information has to be transmitted over the network, which cannot jeopardize stability of the teleoperation framework. The dual-proxy model uses knowledge of the robot environment, that can be known a priori or computed with the online perception algorithm described infra, and the knowledge of the robot and haptic device states to generate inputs to the local controllers. The dual-proxy model handles the communication between the robot and haptic device and prevents non-collocation issues. It is described in FIG. 3.

Computing Haptic and Robot Proxys

The first role of the dual-proxy model is to handle the communication between the two robots and to generate a proxy for each. The proxy captures the behavior of a robot and of the haptic device in the frame of the other. To this end, the dual-proxy model copies each robot position data and transforms it through a proper workspace mapping. The most commonly used mapping relates the two workspaces via a translation, rotation and constant scaling factor.

The haptic device current position $x_h$ and orientation $R_h$, are measured in the device frame. They encode the human desired pose for the robot. These position and orientation are sent to the dual-proxy model, where they are mapped onto the robot frame, thanks to the rotation matrix from the device frame to the robot frame $R_{h-r}$, the translation between the robot frame and the desired center of the robot workspace in position $p_{r-cw}$ and orientation $R_{r-cw}$, and the scaling factor s, to obtain the robot proxy position $x_{p,r}$ and orientation $R_{p,r}$:

$$x_{p,r} = p_{r-cw} + s R_{h-r}{}^T x_h$$

$$R_{p,r} = R_{h-r}{}^T R_h R_{h-r} R_{r-cw} \quad (1)$$

The reverse transformation is done to compute the haptic proxy $x_{p,h}$, $R_{p,h}$ from the robot position $x_r$ and orientation $R_r$:

$$x_{p,h} = R_{h-r}(x_r - p_{r-cw})/s$$

$$R_{p,h} = R_{h-r} R_r R_{r-cw}{}^T R_{h-r}{}^T \quad (2)$$

It is worth noting that the same workspace mapping transformation is applied to any data passed through the network from one robot to the other, to maintain the physical consistency between all remote information. In particular, the model of the robot environment geometry needs to be mapped to the haptic device to generate correct force feedback.

In general purpose teleoperation applications, the communication network is often slower than the desired control frequency and rarely ensures the hard-real-time constraints of haptic-robot interaction. In addition, communication delays and packet losses generate many issues in conventional teleoperation systems that use one global feedback loop. This is particularly true when there is a significant distance between the haptic device and the robot, for example when teleoperating a robot in space.

The dual-proxy model removes these communication issues. Indeed, since the dual-proxy model and the two local controllers are independently implemented, they can run at different frequencies. Typically, the local control loops will run at 1 kHz or more to get the best possible performances. However, the communication channel can run at a lower frequency, which will mostly depend on the chosen communication technology, and will typically be between 10-100 Hz. In addition, this frequency difference enables the computation of smooth proxys by averaging, in the fast controllers, position data between two consecutive communication messages. Finally, communication delay and latency spikes can be monitored by the dual proxy in many ways without compromising on the performance of the local control loops as it runs independently.

Task-Related Proxy Projection

The second role of the dual proxy is to use the proxys, robot configurations and robot environment information to generate motion and force control inputs. A broad spectrum of physical interaction is involved when performing tasks in haptic teleoperation. Remote minimally-invasive surgical operations require a high accuracy in motion while assembly tasks or polishing works need precise perception and regulation of the contact forces with the environment. This range of interaction implies different objectives for the local control loops. To achieve high fidelity in both motion and contact tasks, the dual-proxy model smartly generates the control inputs such as they properly reflect the real-world physical interaction. The strategy includes either computing a motion command, if the robot is moving in some direction, or computing a force command when the robot is in contact with the environment.

The computation of the control inputs is based on a projection of the robot proxy and haptic proxy onto motion and force spaces, defined by the task physical interaction, whether the robot is in contact with the environment or not. The environment geometry is described locally by the directions of constraints and directions of free motion. These are encoded by selection matrices for the robot force space $\Omega_f$ and the robot motion space $\Omega_m$. These matrices are 3D projection matrices, and their rank corresponds to the number of degrees of freedom in the force and motion space respectively. Besides, the force space and motion space need to be orthogonal so we have $\Omega_f + \Omega_m = I_{3 \times 3}$. A similar selection process projects the end-effector rotational motion and applied torques onto rotation and moment spaces, respectively through $\Omega_{rot}$ and $\Omega_\tau$, with $\Omega_{rot} + \Omega_\tau = I_{3 \times 3}$. Note that because of these relationships, only the force and moment selection matrices need to be transferred from the robot to the haptic device. However, they need to be mapped to the haptic device workspace. The force and moment selection matrices for the haptic device are therefore:

$$\Omega_{f,h} = R_{h-r} \Omega_f R_{h-r}{}^T$$

$$\Omega_{\tau,h} = R_{h-r} \Omega_\tau R_{h-r}{}^T \quad (3)$$

FIG. 4 shows the generation of force and motion commands for the robot and haptic device. On each side, the proxy is projected to the force/moment spaces on the one hand, and to the motion (linear and angular) spaces on the other hand. On the motion space, the projected proxys represent the goal points. On the force/moment spaces, the position/orientation difference is transformed to a reference force using a virtual spring. The generation of the linear inputs is described here as the generation of rotational inputs is very similar. On the robot side, the set points for the motion and force controllers are:

$$\Delta x_m = \Omega_m(x_{p,r} - x_r)$$

$$F_r = k_{vir,r} \Omega_f(x_{p,r} - x_r) \quad (4)$$

where $k_{vir,r}$ is the stiffness of the virtual spring on the robot side. Monitoring these task-based control modalities at the robot level gives an intuitive and explicit control of the task interaction, whether it involves precise motions or contact forces. The robot local controller regulates the end-effector dynamic behavior to reach the desired control objectives and properly perform the remote task. On the haptic side, the controller must reflect the task interaction to the human operator. The haptic control objective is, therefore, to produce a high-fidelity remote sensing of the contact forces without any constraint in free space. The haptic control inputs reflect the contact force onto the force space while ensuring free motion of the operator onto the motion space. The projection-based approach ensures a good free space transparency as the desired control force is set to zero in motion space. In the force space, the feedback force is generated as:

$$F_h = k_{vir,h} \Omega_{f,h}(x_{p,h} - x_h) \quad (5)$$

In addition to avoiding the exchange of force signals, computing the desired haptic and robot force through a virtual-spring model is a convenient tool to adjust the haptic feedback, with respect to the device maximum stiffness, and to adapt the robot behavior in contact. For example, one could reduce the spring stiffness to bring compliance in the force control input and to increase safety of the interaction. If the same virtual-spring model is implemented on both sides, the same (opposite) desired forces, up to the scaling factor, are input to the robot and haptic local loops.

Adjusting the Local Control Inputs

The last component of the dual-proxy model aims at maintaining safety and adequacy of the control inputs for the local loops. The desired force and motion, computed from the proxy projection, are adjusted according to high-level exchanged information, such as the control and communication frequencies, the robot and haptic device limits, or task-related constraints. Therefore, each proxy-based input not only reflects the interaction, but is also adapted to the controlled robot and can be modified to increase task performances.

The first step is to perform safety checks on the control inputs with respect to hardware limitations. It ensures physical consistency of the desired force and motion for the two robots. The desired haptic feedback is maintained under the haptic device maximum force, and damping can be added in the force space to prevent undesired oscillations. On robot side, if the motion input goes outside the range of motion, it is projected back onto the robot workspace. The robot control force can also be saturated to a maximum value to preserve safety of the robot/environment contact. Finally, the monitoring of communication delays and possible latency spikes enables the dual proxy model to reject potentially dangerous and outdated commands.

An additional safety stage is implemented on the robot side to prevent the control motion to go outside the robot kinematic and dynamic operational range. The motion command is interpolated according to the robot maximum velocity and acceleration in the operational space. The desired robot motion is, therefore, safely reachable, even if the human motion input is too fast or involves high acceleration change. In addition, the frequency difference between the communication loop and the control loops might result in undesired step commands in the force space. Therefore, the desired forces on both sides are also interpolated to avoid step commands in the forces that would be uncomfortable for the human on the haptic device and potentially dangerous on the robot side.

These safety measures enable the generation of safe commands for the robot and haptic device, regardless of what is happening on the other side of the communication network, or the time it took for the data to be transmitted.

Online Perception of Robot Environment for Task-Level Autonomy

With the framework, the proper knowledge and communication of the robot environment geometry, that is to say the force space and motion space, is crucial to the haptic force fidelity. In certain tasks (in manufacturing for example), it is possible to know in advance the location and direction of the constraints. However, in general use cases, one would want the robot to autonomously detect the directions of constraints, in real time, to infer the force and motion spaces and properly parameterize the proxy projection. Here, we design a particle filter called the Force-Space Particle Filter (FSPF). The FSPF states will represent the likely contact normals at the robot end effector, and will allow one to find the force and motion spaces. For an exemplary embodiment, the FSPF was developed and implemented for linear force and motion spaces, but its extension to angular force/motion spaces is immediate.

The Force-Space Particle Filter

The idea behind the FSPF is the following: given a robot in contact that is moving, one should be able to find the contact normal by combining contact force and velocity data. In particular, the contact normal is going to be more or less in the direction of the sensed force, and orthogonal to the robot velocity.

The FSPF state space is the 3d unit sphere plus its center. The sphere represents all the possible contact normals at the robot end effector, while its center encodes the belief that there is no contact on the robot end effector. FIG. 5 shows the behavior of the FSPF. When the robot is in free space, one would expect most particles to be at the center. When the robot is in contact in a single direction, one would expect most particles to be grouped around the normal to the contact. When there are several directions of contact, the particles will be scattered along all the probable directions and will form a portion of circle (2 directions of contact) or a portion of sphere (3 directions of contact). Every iteration of the particle filter consists in two steps, the update step and the resampling step. Let $P_k$ (P is also referred to herein as $\mathscr{P}$) be the list of particles at the $k_{th}$ iteration of the filter, and $n_p$ the number of particles. We will use the symbol p to refer to individual particles. Let us also note $F_s, v_s, F_m, F_f$ respectively the end effector sensed force, the sensed velocity, the control force in motion space and the control force in force space. These four quantities are required in the update and resampling steps.

The update step involves creating a list of augmented particles $\tilde{P}_k$ knowing the current list of particles and the control and sensor inputs. $\tilde{P}_k$ contains $\tilde{n}_p > n_p$ particles. The resampling step first assigns a weight $w(\rho, F_s, v_s) \in [0, 1]$ to each particle $\rho \in \tilde{P}_k$ that measures the likeliness of that particle given the sensor measurements, and, then, resamples $n_p$ particles from $\tilde{P}_k$ by prioritizing the particles with high weights in order to obtain the next list of particles $P_{k+1}$.

Step 1: Update

At any point during robot operation, 3 things can happen:
The contact directions can change.
A contact direction can appear.
A contact direction can disappear.

The update step needs to accommodate for these three possibilities. The augmented particle list $\tilde{\mathscr{P}}$ is created, starting with an empty list $\tilde{\mathscr{P}} = \emptyset$ and using the procedure described in Algorithm 1. In one example, a parameter $0 < \varepsilon \ll 1$ is used to numerically determine if the vectors are at the origin. The algorithm is explained next:

1. First, one takes each particle in $\mathscr{P}_k$ and move it randomly following a normal distribution N $(\alpha, \Sigma)$ (if it is not at the center). $\alpha$ is the mean of the normal distribution and $\Sigma$ its standard deviation. One will then add the obtained particle to $\tilde{\mathscr{P}}_k$. This allows to take into account the possible rotation of the force space.

2. Second, one will look at the direction of the motion control force $F_m$ and create a tentative particle $\rho_{tent}$. One will assume that if a contact appears, it will be in the direction towards which the robot is moving. To know if this tentative particle should be added, one could look at its likeliness using the same weight function as the resampling step (that will be later described) $w(\rho_{tent}, F_s, v_s)$. One then creates new particles between the force control $F_f$ direction and the tentative particle. The higher the likeliness of $\rho_{tent}$, the more particles one would add. This step allows the filter to take into account a new direction of contact.
3. Third, one would add one particle at the center in order to take into account a possible contact loss.
4. Finally, one would normalize all the particles that are not in the center to project them back onto the sphere.

---
Algorithm 1: FSPF Update Step
---

```
Result: A list of augmented particles 𝒫_k
/* start with an empty list                             */
𝒫_k = [ ];
/* move the existing particles                         */
for ρ ∈ 𝒫_k do
|       if ‖ρ‖ > ε then
|       |       d ~ 𝒩(α, Σ);
|       else
|       |       d = 0;
|       end
|       𝒫_k.append(ρ + d)
end
/* add particles in the direction of motion
                control                                */
if ‖F_m‖ > ε then
|       ρ_tent = F_m/‖F_m‖;
|       if ‖F_f‖ > ε then
|       |       u_f = F_f/‖F_f‖;
|       else
|       |       u_f = 0;
|       end
|       n_add = w(ρ_tent, F_s, v_s) * n_p;
|       for i ∈ [1, n_add] do
|       |       s = (i − 0.5)/n_add;
|       |       𝒫_k.append(s * u_f + (1 − s) * ρ_tent);
|       end
end
/* add a particle at the center                        */
𝒫_k.append(0);
/* renormalize all particles                           */
for ρ̄ ∈ 𝒫_k do
|       if ‖ρ̄‖ > ε then
|       |       ρ̄ = ρ̄/‖ρ̄‖;
|       else
|       |       ρ̄ = 0;
|       end
end
```

---
Algorithm 2: FSPF Resampling Step
---

```
Result: A list of resampled particles 𝒫_{k+1}
/* compute the list of cumulative weights              */
w_list = [ ];
w_cumul = 0;
for ρ̄ ∈ 𝒫_k do
|       w_cumul = w_cumul + w(ρ̄, F_s, v_s);
|       w_list.append(w_cumul);
end
/* rescale the cumulative weight list                  */
for w ∈ w_list do
|       w = w/w_cumul;
end
/* perform low variance resampling                     */
𝒫_{k+1} = [ ];

r ~ 𝒰(0, 1/n_p);

l = 0;
for i ∈ [1,n_p] do
|       while w_list[l] > r do
|       |       l = l + 1;
|       end
|       𝒫_{k+1}.append(𝒫_k[l]);
```

---
Algorithm 2: FSPF Resampling Step
---

```
|       r = r + 1/n_p;
end
```

Step 2: Resampling

One defines a force weight function $w_f$ and a velocity weight function $w_v$ for a given particle $\rho$ and the value of the measured force $F_s$ and velocity $v_s$. These functions represent a credence value for the particle based on the force sensor measurement and the velocity measurement. For the force weight function and particles on the sphere, one will consider that if the sensed force is higher than a threshold $f_h$ in the direction of the particle, then it is highly likely, and if it is lower than a threshold $f_l$, it is not likely at all. For particles at the center of the sphere, one would consider them likely if there is no sensed force, and not likely if the sensed force is high. Equation 6 is defined as:

$$w_f(\rho, F_s) = \begin{cases} \dfrac{\langle \rho, F_s \rangle - f_l}{f_h - f_l} & \text{if } \rho \neq 0 \\ 1 - \dfrac{\|F_s\| - f_l}{f_h - f_l} & \text{if } \rho = 0 \end{cases} \quad (6)$$

where $\langle ., . \rangle$ represents the euclidean scalar product. For the velocity weight function and particles on the sphere, one will consider that a particle is not very likely if there is a significant velocity in its direction or its opposite direction, and it is likely otherwise. For particles at the center, the velocity gives no information (as the robot could be moving in free space or in contact) so one will assign a velocity weight of 0.5. Equation 7 is defined as:

$$w_v(\rho, v_s) = \begin{cases} 1 - \dfrac{|\langle \rho, v_s \rangle| - v_l}{v_h - v_l} & \text{if } \rho \neq 0 \\ 0.5 & \text{if } \rho = 0 \end{cases} \quad (7)$$

where $v_h$ and $v_l$ are high and low velocity thresholds. FIG. 6 shows exemplary weight functions. The thresholds $f_l, f_h, v_l, v_h$ are used to provide some robustness to sensor noise and prevent the detection of false contacts. They need to be tuned depending on the system and sensors.

Using the previously defined functions, one can perform the resampling step. The weight of each particle $w(\rho, F_s, v_s)$ is defined as the product of the force and velocity weights for that particle:

$$w(\rho, F_s, v_s) = w_f(\rho, F_s) w_v(\rho, v_s) \quad (8)$$

One can see that $w(\rho, F_s, v_s)$ is always between 0 and 1. Besides, the product means that as soon as one of the sensor modalities deems the particle unlikely, then it will be excluded. For the resampling itself, one could use low variance resampling to prevent the loss of particles that are isolated but have a high probability. The resampling step is implemented using Algorithm 2.

Finding the Force and Motion Spaces

The output of the FSPF, described supra, is a list of likely particles at the current time. One would need to extract a likely force space and motion space from this particle list. Intuitively, the distribution of the particles will give enough information to estimate the force and motion directions. In particular:

When most particles are at the center, one expects the robot to be in free space, When most particles are grouped somewhere on the sphere, one expects the force space to be of dimension one, and the location of the particles gives its expected direction.

When most particles are along an arc of circle, one expects the force space to be of dimension two, and its direction is given by the plane that contains the arc of circle.

When the particles are scattered in a 3d pattern on the sphere, one expects the force space to be of dimension three.

To find the dimension and direction of the force space, one performs a SVD of the particles. We define $X_p$, a matrix of dimension $3 \times 1.5 * n_p$ such that the first $n_p$ columns of $X_p$ are the coordinates of the $n_p$ particles of the current state of the particle filter $P_k$, and the last $0.5 n_p$ columns are zero (which represent particles at the center). The left SVD of $X_p$ will give a 3d ellipsoid that best explains the points, as depicted in FIG. 7. The magnitude of the principal axes of the ellipsoid are the singular values and their orientation are the singular vectors. The directions associated with high singular values are force directions and the ones associated with low singular values are motion directions.

Let's note $d_{fs}$ the dimension of the force space that can be between 0 and 3. Let's also note U the 3×3 matrix of the left singular vectors of $X_p$, and $U=[U_1\ U_2\ U_3]$ its columns. Let us finally note $S=[\sigma_0, \sigma_1, \sigma_2]$ the vector whose elements are the singular values of $X_p$ ordered in decreasing order ($\sigma_0 \geq \sigma_1 \geq \sigma_2$). Here one applies Algorithm 3 to find the selection matrices $\Omega_f$ and $\Omega_m$. The algorithm is also described here:

The norm of S gives an indication on the number of particles that are not at the center. Indeed, since all particles have norm 1 or 0, let m be the number of particles not at the center, we have $\|S\|=\sqrt{m}$. In general, one will consider that the robot is in free space unless at least half of the particles are not at the center. Therefore, we have the following relationship:

$$\text{if } \|S\| < n_p/2, d_{fs} = 0 \quad (9)$$

When $d_{fs}>0$, two thresholds are defined $0<\alpha_{add}<1$ and $0<\alpha_{remove} \leq \alpha_{add}$ that will be used to add or remove dimensions in the force space. When $\sigma 1 > \alpha_{add} \sigma_0$, and $\sigma_2 > \alpha_{add} \sigma 0$, we add their directions to the force space. When $\sigma_1 < \alpha\text{remove } \sigma_0$, and $\sigma_2 < \alpha_{remove} \sigma_0$, one removes their directions from the force space. Choosing $\alpha_{add} > \alpha_{remove}$ generates some hysteresis in the value of $d_{fs}$ which helps stabilizing the transitions.

With the value of $d_{fs}$, we can compute the projection matrices $\Omega_f$ and $\Omega_m$ from the columns of U.

The three algorithms presented in this section show the full implementation of the FSPF. The particle filter is used to provide an added layer of local autonomy. The controllers on the robot and haptic side can self-parameterize autonomously in real time using sensory observations. The FSPF and the dual-proxy model are the key innovations in the local autonomy-based approach. For the robot and haptic local controllers, many choices can be made.

---

Algorithm 3: FSPF Force and Motion space Matrices Computation

Result: $d_{fs}$, $\Omega_f$ and $\Omega_m$
/* compute the SVD of the particles */

Algorithm 3: FSPF Force and Motion space Matrices Computation

```
X_p = Matrix.Zeros(3, 1.5n_p);
i = 0 for ρ ∈ 𝒮_k do
|       X_p[i, :] = ρ;
|       i = i + 1;
end
U,S,V = SV D(X_p) ;  // U is 3x3, S is 3x1 and
    the coefficients are in decreasing order
/* compute the dimension of the force space
                    and the projection matrices          */
if ‖S‖ < n_p/2 then
|       d_fs = 0;
|       Ω_f = 0;
|       Ω_m = I_3;
else
|       /* compute the dimension using the lower
                    and higher thresholds              */
|       d_lb = 3 − (σ_1 < α_remove σ_0) − (σ_2 < α_remove σ_0);
|       d_hb = 1 + (σ_1 > α_add σ_0) + (σ_2 > α_add σ_0);
|       if d_fs < d_lb then
|       |       d_fs = d_lb;
|       end
|       if d_fs > d_hb then
|       |       d_fs = d_hb;
|       end
|       /* compute the projection matrices            */
|       if d_fs == 1 then
|       |       Ω_f = U_1 U_1^T;
|       |       Ω_m = I_3 − Ω_f;
|       else
|       |       if d_fs == 2 then
|       |       |       Ω_m = U_3 U_3^T;
|       |       |       Ω_f = I_3 − Ω_m;
|       |       else
|       |       |       Ω_f = I_3;
|       |       |       Ω_m = 0;
|       |       end
|       end
end
```

Implementation of the Local Controllers

The local autonomy-based dual-proxy method allows one to choose controllers for the robot and haptic device independently of everything else. The dual-proxy model and FSPF together ensure the safety and physical consistency of the local control inputs, as well as the correct parameterization of force and motion spaces. The robot local controller needs to be able to regulate both free space motions and physical interactions in a stable way. Two good choices are to implement an impedance controller or a unified force/motion control. The latter requires a re-parameterization of the controller when the force space changes, but it enables a completely decoupled dynamic response in force space and in motion space. In haptic applications, the choice of stiffness in force space will mostly depend on the maximum stiffness that the haptic device can render, and the compliance needed for the task. One would want to be able to select it independently of the free-space motion tracking performance. For this reason, the inventors advocate for the usage of operational space control on the robot side. On the haptic side, the controller will mostly depend on which haptic device is used. When using a low-inertia haptic device with isotropic force capabilities, an open-loop force controller can be implemented to monitor the force feedback. Note that even if one used impedance control on the robot side, the force/motion-space projection would still be required to compute consistent haptic control inputs.

Local Robot and Haptic Device Controllers

Here the inventors used the unified force/motion controller in operational space to locally control both the motion and force modality on the robot. With this decoupling technique and assuming perfect estimates of the dynamic components, the motion/force loops regulate the desired behavior of the decoupled end effector equivalent to a unit mass system in motion space and a force source in force space. This unified control strategy provides good performances in both motion and contact tasks. For completeness, the robot controller is described here. Let's take a robot arm in contact with the environment at its end effector. The dynamic equations of the robot, expressed in joint space, are:

$$A(q)\ddot{q}+b(q,\dot{q})+g(q)+J^T F_c=\Gamma \quad (10)$$

where A is the robot mass matrix, b is the vector of centrifugal and coriolis forces, g is the joint gravity vector, J is the task jacobian at the end effector, $F_c$ is the vector of contact forces resolved at the task point and $\Gamma$ is the joint torque vector. The operational space dynamics of the robot at the end effector is obtained by multiplying the previous equation by the transpose of the dynamically consistent inverse of the Jacobian: $\bar{J}^T = \Lambda J A^{-1}$.

$$\Lambda \ddot{x}+\mu+p+F_c=F \quad (11)$$

where $$\Lambda=(JA^{-1}J_T)^{-1}$$

$$\mu=\bar{J}^T b-\Lambda \dot{J}\dot{q}$$

$$p=\bar{J}^T g$$

are respectively the task space inertia matrix, the task space centrifugal and coriolis forces and the task space gravity. F is the task force and x is the task space coordinates.

With the robot in contact, its workspace is separated into the force space (directions of constraints) and the motion space (directions of free motion). The force-space and motion-space specification matrices, respectively $\Omega f$ and $\Omega_m$, are obtained via the FSPF. By projecting the robot-proxy interaction, the dual-proxy model computes two setpoints for the robot local controller: the displacement $\Delta x_m$ on motion space and the desired contact force $F_r$ on force space. With the chosen unified force/motion control approach, two distinct controllers are, then, designed to monitor the robot behavior in the force and motion directions.

The control force in motion space Fm is generated by an operational space proportional derivative (PD) controller:

$$F_m = \hat{\Lambda}(K p_m \Delta x_m - K v_m \Omega_m \dot{x}) \quad (12)$$

where the estimate of the task space inertia $\hat{\Lambda}$ is used to dynamically decouple the system. $K_{pm}$ is the proportional gain and $K_{vm}$ is the derivative gain.

The control force in force space $F_f$ is computed to follow the desired robot force $F_r$ computed by the dual-proxy model thanks to a proportional integral (PI) controller with feedforward force compensation and a velocity-based damping term. The proportional and integral gains are respectively $K_{pf}$ and $K_{if}$ and the damping gain is $K_{vf}$. The sensed task force $F_s$ is used as feedback to the PI loop.

$$F_f = F_r - K p_f(F_s-F_r) - K i_f \int (F_s-F_r) - K v_f \Omega_f \dot{x}_r \quad (13)$$

Finally, the two controllers are composed together, with two additional gravity and Coriolis/centrifugal compensation terms, to produce the dynamically decoupled and unified force/motion control force F.

$$F=F_f+F_m+\hat{\mu}+\hat{p} \quad (14)$$

$\hat{\mu}$ and $\hat{p}$ respectively represent estimates of the task space Coriolis and centrifugal forces, and of the gravity. The control torques in joint space are, then, simply computed as:

$$\Gamma=J^T F \quad (15)$$

If the robot is redundant with respect to the task, the redundancy can be controlled thanks to a control torque vector FO projected into the dynamically consistent null-space of the task N such that:

$$\Gamma=J^T F+N^T \Gamma_0 \quad (16)$$

where $$N=I_{n \times n}-\bar{J}J \quad (17)$$

Such a unified force/motion closed loop at the robot level yields the expected end-effector dynamic behavior to perform the remote task. It monitors the task-consistent control inputs, generated by the dual-proxy model to produce the haptic-robot interactions.

On the haptic side, the haptic local closed loop must reflect the task interaction to the human operator. The desired haptic feedback Fh that was computed by the dual-proxy model, is sent as an input to the local controller. This force command is exclusively within the force space, such that the motion feels fully unconstrained in the motion space. The haptic controller also needs to compensate for parasitic dynamic components of the haptic device, which can be decently assimilated to the operational space estimated gravity $\hat{p}h$ when using a low inertia, low friction and parallel haptic device. For such devices, which rarely have a force sensor, open-loop force control is usually satisfactory. We also neglect Coriolis and centrifugal effects as they are small and depend on the human arm dynamics. The haptic control force is computed, with a velocity-based damping term of gain $K_{vf,h}$, by:

$$f_{f,h}==F_h+\hat{p}_h-K v_{f,h}\Omega_f \dot{x}_h \quad (18)$$

Overall, the full implementation of the local controllers is depicted in FIG. 8. It is worth noting that the proxy-based projection method can be used as an input to any local controller, on both sides, to achieve optimal performances for different applications. For example, a PI controller could be implemented at the device level to close the force loop, if one has access to a force sensor there, to increase the accuracy in force tracking. In the case of a high-inertia haptic device without force sensor, the haptic control loop could also be directly closed on the haptic-proxy position error. The framework modularity enables to adjust the controllers to the hardware details, whatever devices or strategies are used in the teleoperation system.

This application claims the benefit from U.S. Provisional Application 63/116,418 filed Nov. 20, 2020, which is hereby incorporated by reference for everything it teaches.

What is claimed is:

1. A method for controlling a robot via a haptic interface, comprising:
    (a) having a robot controlled by a local, independent robot controller, wherein the robot interacts with an environment, and wherein the robot controller distinguishes a unified force and motion controller, parametrized autonomously;
    (b) having a haptic device controlled by a local, independent haptic controller, wherein the haptic controller distinguishes a unified force and motion controller, parametrized autonomously;
    (c) having an environment estimator near or within the robot controller estimating single or multi-dimensional geometric constraints from the robot interactions with the environment, wherein the geometric constraints are defined in orientation and position; and (d) having a dual proxy model separated connecting the robot controller and the haptic controller, wherein the dual proxy model calculates outputs defined as (i) a parametrization for the robot and haptic unified controllers, (ii) a force command and a motion command for the robot unified force and motion controller, (iii) a force feedback command and a motion command for the unified force and motion haptic controller, wherein the outputs are calculated by the dual proxy model receiving inputs defined as (j) position information from the haptic device, (jj) the geometric constraints from the environment estimator, and (jjj) position information from the robot, and wherein the calculated outputs are consistent with the robot and haptic device capabilities, and with a safe haptic-robot interaction.

* * * * *